United States Patent
Di Sante et al.

(10) Patent No.: US 10,343,371 B2
(45) Date of Patent: Jul. 9, 2019

(54) ARTICLES MADE OF MULTILAYER COMPOSITE MATERIAL AND PREPARATION METHODS THEREOF

(75) Inventors: Giuseppe Di Sante, Roseto Degli Abruzzi (IT); Mario Biggio, Teramo (IT); Mario Di Paolantonio, Giulianova (IT); Gianluca Giovine, San Nicolo' A Tordino (IT)

(73) Assignee: INDUSTRIALESUD S.P.A. (IT)

( * ) Notice: Subject to any disclaimer, the term of this patent is extended or adjusted under 35 U.S.C. 154(b) by 0 days.

(21) Appl. No.: 14/354,498

(22) PCT Filed: Oct. 31, 2011

(86) PCT No.: PCT/IB2011/054829
§ 371 (c)(1),
(2), (4) Date: Apr. 25, 2014

(87) PCT Pub. No.: WO2013/064859
PCT Pub. Date: May 10, 2013

(65) Prior Publication Data
US 2014/0272349 A1    Sep. 18, 2014

(51) Int. Cl.
*B32B 5/24* (2006.01)
*B32B 5/02* (2006.01)
(Continued)

(52) U.S. Cl.
CPC ............... *B32B 5/24* (2013.01); *B32B 5/022* (2013.01); *B32B 5/06* (2013.01); *B32B 5/26* (2013.01);
(Continued)

(58) Field of Classification Search
CPC .... B32B 5/24; B32B 5/02; B32B 5/06; B32B 5/26; B32B 2605/08; B32B 37/04;
(Continued)

(56) References Cited

U.S. PATENT DOCUMENTS 4,532,169 A * 7/1985 Carley ............... B29C 53/8016
156/161
4,690,851 A * 9/1987 Auduc et al. ............... 428/116
(Continued)

FOREIGN PATENT DOCUMENTS

CA    2274168 A1 *  7/1998
EP    0238472 A2    9/1987
(Continued)

OTHER PUBLICATIONS

International Search Report in corresponding PCT/IB2011/054829 dated May 23, 2012.
(Continued)

*Primary Examiner* — Frank J Vineis
*Assistant Examiner* — Michael Zhang
(74) *Attorney, Agent, or Firm* — MH2 Technology Law Group LLP (57) ABSTRACT

An article may be made of multilayer composite material. The multilayer composite material may include central element (I) between first and second reinforcement layers (B) to form structure (B)-(I)-(B). The central element (I) may include: first and second structural layers (A), each of the first and second structural layers (A) including at least one mat of needle punched thermoplastic fibers selected from polyester fibers, polyamide fibers, polypropylene fibers, or mixtures thereof bonded through thermosetting resin; and third reinforcement layer (B) between the first and second structural layers (A). The first, second, and third reinforcement layers (B) each may include fibrous material, including one or more types of fibers selected from glass fibers, natural fibers, carbon fibers, basalt fibers, aramid fibers, or mixtures thereof.

18 Claims, 3 Drawing Sheets

(51) Int. Cl.
  *B32B 5/06* (2006.01)
  *B32B 5/26* (2006.01)
  *B32B 38/00* (2006.01)
  *B32B 37/04* (2006.01)
  *B32B 38/12* (2006.01)

(52) U.S. Cl.
  CPC .............. *B32B 37/04* (2013.01); *B32B 38/12* (2013.01); *B32B 2250/20* (2013.01); *B32B 2255/02* (2013.01); *B32B 2605/003* (2013.01); *B32B 2605/08* (2013.01); *Y10T 156/1044* (2015.01); *Y10T 428/2495* (2015.01); *Y10T 442/659* (2015.04); *Y10T 442/682* (2015.04); *Y10T 442/688* (2015.04)

(58) Field of Classification Search
  CPC . B32B 38/12; B32B 2250/20; B32B 2255/02; B32B 2605/003; Y10T 442/659; Y10T 442/682; Y10T 442/688; Y10T 428/2495; Y10T 156/1044
  USPC .................. 428/213; 448/387, 271, 272, 240
  See application file for complete search history.

(56) References Cited

U.S. PATENT DOCUMENTS

| | | | | | |
|---|---|---|---|---|---|
| 4,741,945 | A | * | 5/1988 | Brant | B32B 5/18 296/211 |
| 4,751,134 | A | * | 6/1988 | Chenoweth | D04H 1/60 428/361 |
| 4,840,832 | A | * | 6/1989 | Weinle | B32B 5/26 296/214 |
| 4,851,283 | A | * | 7/1989 | Holtrop | B32B 5/24 181/290 |
| 5,217,799 | A | * | 6/1993 | Sumii et al. | 442/326 |
| 5,908,689 | A | * | 6/1999 | Dana | B32B 5/28 264/258 |
| 6,548,155 | B1 | * | 4/2003 | Jaffee | B32B 5/26 428/297.4 |
| 2001/0000162 | A1 | * | 4/2001 | Fletemier | B32B 27/00 442/35 |
| 2002/0058452 | A1 | * | 5/2002 | Sante | B32B 17/02 442/372 |
| 2004/0234744 | A1 | * | 11/2004 | Byma | B29B 17/0005 428/304.4 |
| 2005/0241757 | A1 | * | 11/2005 | Gomez | B29C 51/14 156/307.3 |

FOREIGN PATENT DOCUMENTS

| | | | |
|---|---|---|---|
| EP | 0908303 A2 | 4/1999 | |
| EP | 1199154 A2 | 4/2002 | |
| EP | 1851092 B1 * | 6/2012 | ......... B60R 13/0225 |
| JP | 62-206087 A | 9/1987 | |
| JP | 07-214719 A | 8/1995 | |
| JP | 2004-017354 A | 1/2004 | |
| JP | 2006-305867 A | 11/2006 | |
| JP | 2007-331673 A | 12/2007 | |
| JP | 2008-174073 A | 7/2008 | |
| RU | 2072922 C1 | 2/1997 | |

OTHER PUBLICATIONS

English Abstract of RU 2072922 C1, dated Feb. 10, 1997.
English machine translation of Description of RU 2072922 C1, dated Feb. 10, 1997.
English machine translation of Claims of RU 2072922 C1, dated Feb. 10, 1997.
Decision to Grant a Patent for an Invention in RU 2014117927/05 (028427) dated Feb. 10, 2016 which corresponds to U.S. Appl. No. 14/354,498, filed Apr. 25, 2014 with partial English translation.
English translation of allowed claims in RU 2014117927/05 (028427).
Japan Patent Office Action in counterpart application dated Oct. 26, 2015.
English Abstract of JP 07-214719 dated Aug. 15, 1995.
English Abstract of JP 62-206087 dated Sep. 10, 1987.
English Abstract of JP 2004-017354 dated Jan. 22, 2004.

* cited by examiner

ARTICLES MADE OF MULTILAYER COMPOSITE MATERIAL AND PREPARATION METHODS THEREOF

CROSS-REFERENCE TO RELATED APPLICATION(S)

This application is a national stage entry from International Application No. PCT/IB2011/054829, filed on Oct. 31, 2011, in the Receiving Office ("RO/IB") of the World Intellectual Property Organization ("WIPO"), and published as International Publication No. WO 2013/064859 A1 on May 10, 2013 the entire contents of which, are incorporated herein by reference.

The present invention refers to an article made of a multilayer composite material and to the preparation method thereof.

The present invention concerns, in particular, articles made of a multilayer composite material especially capable of being used as components for automobiles, like, for example, door panels, dashboards, glove compartments and bumpers.

In the state of the art the components for automobiles, both those used inside the passenger compartment (hereafter "vehicle interior components") and those used outside the passenger compartment (hereafter "vehicle exterior components"), are made mainly with thermoplastic materials, especially rigid polyurethane polymers reinforced with glass fibres. The processes for producing these components comprise Reinforced Reaction Injection Molding (r-rim) or thermoplastic injection processes and the moulding of heated sheets and subsequent cooling in the mould.

Other polymeric materials used in the state of the art to make vehicle interior and exterior components are polypropylene, polycarbonate/ABS (acrylonitrile-butadiene-styrene), polyamide, polyesters and polycarbonates, possibly reinforced with mineral or natural fillers, like polypropylene reinforced with glass fibres, polypropylene reinforced with sawdust (Woodstock®) and mixtures of polycarbonate/ABS (acrylonitrile-butadiene-styrene).

The vehicle interior components can be surface-coated, for example with fabrics, imitation leather or natural leather. The vehicle exterior components are generally painted.

In order to make some types of internal components, for example the headliners, in the state of the art it is also known to use multilayer composite materials (WO 00/17435 and EP 1199154 A2).

With multilayer composite materials it is also possible to produce articles having the same mechanical properties as articles made from polymeric material obtained through injection moulding, but with a significantly reduced weight.

The multilayer materials known in the art, however, although they have a good mechanical performance/weight ratio, also have the drawback of only being suitable for making vehicle interior components that do not have to satisfy particular requirements in terms of mechanical strength.

Vehicle interior components, such as dashboards, door panels or central console cover, for example, cannot be made of multilayer materials of the state of the art, since they would not satisfy the requirements established by international safety standards of the automotive industry (the aforementioned components, for example, must be able to withstand intense and concentrated crashes, such as the impacts that the driver and/or passengers of a vehicle are subjected to inside the passenger compartment in the case of collision).

The polymeric materials known in the field, as well as weighing more than multilayer materials, for the same mechanical performance, have the further drawback of being sensitive to heat and, in general, of having insufficient stability against thermal stresses (for example, direct and prolonged exposure to sunlight).

Moreover, manufacturing components for automobiles from polymeric material at the industrial level involves higher plant investment costs than multilayer materials.

Moulds for producing articles through injection moulding, for example, are much more expensive than those used to manufacture articles made of multilayer material. This means that injection moulding is an economically advantageous technique only in the case in which large quantities of moulded, finished and uncoated articles must be produced.

The purpose of the present invention is to overcome the drawbacks of materials and processes known in the state of the art.

In particular, a purpose of the present invention is to identify an article made of a multilayer composite material able to be used as a component for automobiles that has high mechanical strength and, at the same time, a low weight.

A further purpose of the present invention is to identify a process for preparing the aforementioned articles with which it is possible to produce articles having a shape and mechanical properties that are extremely variable and, therefore, easy to change as a function of their intended end use.

The aforementioned purposes of the present invention are accomplished by making an article made of a multilayer composite material comprising a central element (I) arranged between a first and a second reinforcement layer (B) to form a structure (B)-(I)-(B), said central element (I) comprising:

a first and a second structural layer (A) each comprising at least one mat of needle punched fibres of the thermoplastic and/or natural type or else a mat of an expanded thermoplastic polymer, said structural layers (A) being impregnated with a thermosetting resin;
a third reinforcement layer (B) arranged between said two structural layers (A), said first, second and third reinforcement layer (B) consisting of a fibrous material, comprising one or more types of fibres selected from the group consisting of glass fibres, natural fibres, carbon fibres, basalt fibres, KEVLAR fibres, aramid fibres or a mixture of such fibres.

A further object of the present invention is a process for preparing the aforementioned article made of a multilayer composite material.

In the rest of the description, in order to better understand the characteristics of the present invention, reference shall be made to the following figures.

From the structural point of view, the article made of a multilayer composite material of the present invention consists of a juxtaposition of layers of materials of different composition, each of which contributes to determining the final properties of the article. In the rest of the present description the ensemble of the different juxtaposed layers of material will also be indicated with the expression "multilayer pack".

The multilayer article object of the present invention is obtained through hot-pressing (thermoforming) of a multilayer pack consisting of a specific sequence of juxtaposed layers of material.

Figure 1:
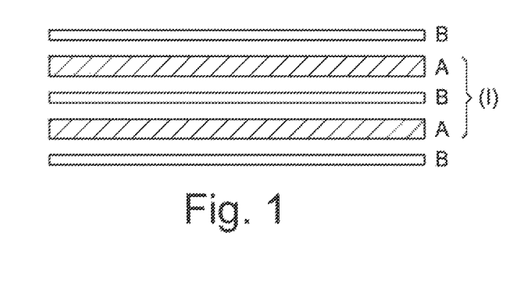
FIGS. 1-4, which schematically represent some possible structures (sequences of layers) of the multilayer composite material according to the present invention.

With reference to FIG. 1, the article according to the present invention comprises at least one central element (I) arranged between at least two reinforcement layers (B) to form a structure (B)-(I)-(B).

The central element (I) is a multilayer element that comprises at least a first and a second structural layer (A) between which a reinforcement layer (B) is arranged to form a structure (A) (B) (A).

The set of layers of the multilayer pack described above can also be indicated as "(B) (A) (B) (A) (B)".

Each structural layer (A) can comprise a mat of needle punched fibres of the thermoplastic and/or natural type (hereafter also indicated as "needle punched mat") or a mat of an expanded thermoplastic polymer.

The thermoplastic fibres of the needle punched mat are selected among polyester fibres, polyamide, polypropylene or a mixture of such fibres. The natural fibres are selected, for example, among jute, coconut and sisal fibres.

The type of fibre of the mat of the structural layer (A) is selected as a function of the specific mechanical properties that it is wished to give to the thermoformed article and, therefore, as a function of its intended end use.

Preferably, at least one of the structural layers (A) is a needle punched mat of polyester fibres.

Preferably, the needle punched fibres of the mat are further bound together through a thermosetting resin.

As stated, the structural layer (A) can be a mat of an expanded thermoplastic polymer, such as polyester, polypropylene, polyurethane or polyamide or mixtures of said polymers. Preferably, the mat is made from expanded polyester or expanded polyurethane.

When subjected to compression, the needle punched mats have a greater bidirectional stretching capability than mats made of expanded thermoplastic material.

In a preferred embodiment, when the multilayer pack comprises at least one mat of expanded thermoplastic polymer, the multilayer pack also includes at least one needle punched mat.

In a further preferred embodiment, the outer structural layers (A) of the central element (I) comprise a mat of needle punched fibres.

The mats described above able to be used as structural layers (A) are in the form of semi-rigid sheets of variable dimensions depending on the dimensions of the component to be made and are available on the market.

Mats of needle punched fibres have an apparent density, i.e. a weight/volume ratio, that varies from 30 to 100 kg/m$^3$, preferably from 50 to 95 kg/m$^3$, even more preferably from 60 to 85 kg/m$^3$.

Mats of expanded thermoplastic polymer, on the other hand, have an apparent density that varies from 50 to 200 kg/m$^3$, preferably from 80 to 120 kg/m$^3$.

The thickness of the mats, both of needle punched fibres and of expanded thermoplastic polymer, varies between 2 and 20 mm, preferably between 4 and 10 mm.

The aforementioned apparent density and thickness values of the mats refer to the mats before being subjected to thermoforming.

For the preparation of the multilayer pack, the mats of needle punched fibres and of expanded thermoplastic polymer are first impregnated with a thermosetting resin, preferably a polyurethane resin.

The resin is applied onto the surface of one or both of the faces of the mat, preferably on both.

During thermoforming, the resin, through the pressure transmitted by the mould, penetrates between the layers of the different juxtaposed materials, binding them together permanently; the heat of the mould carries out the setting of the resin.

The amount of resin applied to the mats varies within the range 30-500 g/m$^2$, preferably 80-150 g/m$^2$ (amount of resin referring to the application on a single face of the mat).

Each reinforcement layer (B) is a layer of fibrous material, where the fibres are selected among glass fibres, natural fibres (jute, sisal (agave) and coconut fibres), carbon fibres, basalt fibres, KEVLAR fibres, aramid fibres or a mixture of the aforementioned fibres.

The Applicant has surprisingly observed that when carbon and/or KEVLAR and/or aramid fibres are used in addition to glass fibres and/or natural fibres, it is sufficient to add a small amount of the first three types of fibres to significantly vary the end mechanical properties of the article made of a multilayer composite material.

In particular, the addition of modest amounts of carbon and/or KEVLAR and/or aramid fibres makes it possible to significantly increase the flexural modulus of elasticity and the resilience of the thermoformed article, without however having an excessive impact on the overall cost of the multilayer composite material.

The layers of fibrous material able to be used as reinforcement layer (B) are available on the market in different formats.

Preferably, to make the multilayer pack are used glass fibres in the form of sheets (mat) having a variable surface density of between 50 and 300 g/m$^2$.

Alternatively, to prepare the multilayer pack it is possible to use roving fibres, which are distributed over one or, more preferably, over both surfaces of the structural layer (A), after it has been impregnated with the thermosetting resin.

Figure 2:
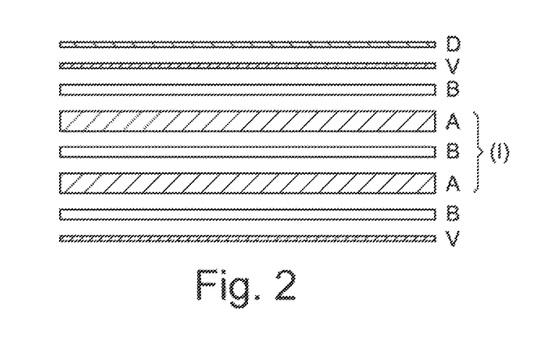

The multilayer pack can also comprise one or more coating layers (D), which define the visible surface of the moulded article (FIG. 2).

The coating layers (D) can, for example, be layers of fabric, of natural leather or synthetic leather, or else non-woven fabric.

The coating layer (D) is juxtaposed over the most outer layer of the multilayer pack so that its surface remains visible, giving the article the desired appearance.

The coating layer (D) is generally placed in direct contact with the most outer reinforcement layer (B) of the multilayer pack.

Between the coating layer (D) and the reinforcement layer (B) closest to it one or more further protective layers (V) can also be arranged, for example made of non-woven fabric (vlies) (FIG. 2).

In order to promote the adhesion of the layers (D) and (V), to each other and with the remaining layers of the multilayer pack, it is possible to apply a layer of glue between the different layers.

As a function of the composition of the layers to be glued, the man skilled in the art, on a case by case basis, can easily select the type of glue to be used.

The coating layer (D) can be inserted in the multilayer pack before it is subjected to thermoforming. Alternatively, the coating layer (D) can be applied onto the article after the thermoforming of the multilayer pack.

The aesthetic finishing of the moulded article can also be carried out through painting of the thermoformed article.

For the purposes of the present description, therefore, the finishing layer (D) can also be taken to mean a layer of paint.

Purely as an example, a possible multilayer pack comprising an outer coating layer (D) and two protective layers (V) is represented by the set of layers that are juxtaposed and in contact "(D) (V) (B) (A) (B) (A) (B) (V)" schematically shown in FIG. 2, where (A), (B), (V) and (D) have the meaning described earlier.

In a multilayer pack, the structural layers (A) can be made from the same material and/or have the same thickness. However, in order to modulate the properties of the end thermoformed article in the most suitable way, it is possible to also use structural layers (A) made with mats having different composition and/or density and/or thickness, and therefore weight compared to one another.

In a preferred embodiment of the articles according to the present invention, the multilayer pack consists of layers (A) and (B) that are juxtaposed and in contact with one another in the sequence "(B) (A) (B) (A) (B)" represented in FIG. 1.

In a particularly preferred embodiment, moreover, the structural layers (A) are mats of needle punched fibres, preferably polyester fibres.

In a second preferred embodiment, the central element (I) of the multilayer pack comprises at least one spacing element or "spacer" (S) arranged between the first and the second structural layer (A). The spacer (S) substantially has the function of spacing apart the structural layers (A), thus increasing the thickness of the thermoformed article.

The spacer (S) can comprise a mat of an expanded thermoplastic polymer, such as polyester, polypropylene, polyurethane, polyamide or a mixture of said polymers, or a mat of the same type as those described earlier for making the structural layers (A). Preferably, the spacer (S) is a mat made of expanded polyester or expanded polyurethane.

Figure 3:
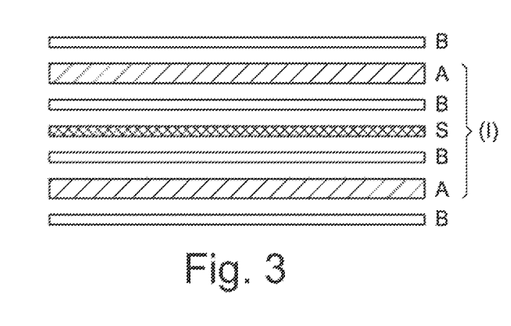

When the central element (I) of the multilayer pack also comprises at least one spacer (S), between said element and each of the structural layers (A) closest to it at least one further reinforcement layer (B) is arranged. Such a central element (I) can thus be represented with the sequence of layers "(A) (B) (S) (B) (A)", where (A), (B) and (S) have the meaning described earlier (FIG. 3).

In a preferred embodiment, in the multilayer pack "(A) (B) (S) (B) (A)" the structural layers (A) consist of needle punched mats, preferably of polyester and the intermediate element (S) is a mat of expanded polyester or of expanded polyurethane.

In order to space apart the structural layers (A) of the central element (I) it is also possible to use two or more spacers (S). In this case, each spacer (S) present in the article will be separated from the structural layer (A) or from the further intermediate element (S) closest to it by interposition of at least one reinforcement layer (B).

Figure 4:
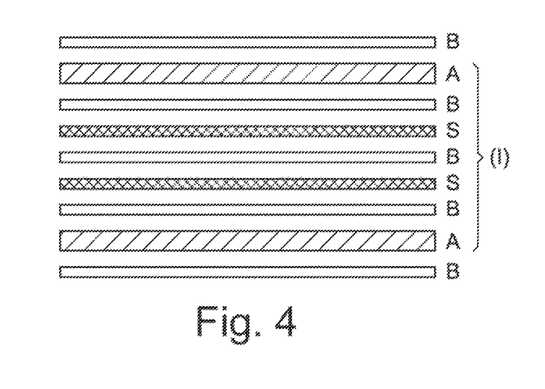

An example of a multilayer pack containing two spacer elements can be represented with the sequence of layers "(B) (A) (B) (S) (B) (S) (B) (A) (B)" (FIG. 4).

Like in the case of the structural layers (A), the mat of a spacer (S) is also used in the preparation of the multilayer pack and of the relative thermoformed article with prior impregnation with a thermosetting resin (on one or, more preferably, both faces).

The process for preparing the article made of a multilayer composite material of the present invention essentially comprises a first step of preparing the multilayer pack and a subsequent step of thermoforming the pack to obtain the final article.

The process can be carried out both manually and in an automated manner with the apparatuses known to the man skilled in the art.

The step of preparing the pack essentially consists of juxtaposing the layers of different materials in the desired sequence to make up the multilayer pack.

Before proceeding to juxtaposing the layers, the structural layers (A) consisting of the needle punched mats and of the mats of expanded thermoplastic are subjected to resin-coating with a thermosetting resin.

The thermosetting resin can be applied by spraying or by dipping the mat in a resin bath or preferably spread by means of a roller machine.

The surfaces of the mat impregnated with resin then have the layers of reinforcement fibres (B) applied to them and, then, the possible protective layer (V) or coating layer (D) according to the desired order.

As a function of the materials used, if necessary, between the coating layers (D) and the layers in contact with them it is possible to apply a small amount of glue to promote the adhesion of the layers during the thermoforming step.

The multilayer pack thus obtained is then subjected to thermoforming in a mould heated to a temperature that can vary between 90° C. and 180° C., preferably between 110° C. and 150° C.

During thermoforming, due to the pressure transmitted to the multilayer pack by the hot mould, the resin penetrates between the different juxtaposed layers of material, binding them together in a stable and permanent manner; the heat of the mould carries out the setting of the resin.

The multilayer material of the present invention is particularly suitable for producing components for automobiles, both vehicle interior components and vehicle exterior components.

Examples of vehicle interior components are: door panels, dashboards, glove compartment, central console cover, front seat backing and rear seat backing, pillar trim, structures of the seats, parcel shelves, trunk liners and relative trims.

Examples of vehicle exterior components are: bumpers, outer rocker cover, wheel arch liners and panels.

The articles made of multilayer composite material object of the present invention are characterised by a favourable ratio between mechanical properties that can be obtained—in particular in terms of modulus of elasticity, resilience and flexural stiffness—and overall weight of the material. For the same weight of the articles made of conventional thermoplastic material (e.g. polyurethane reinforced with glass fibres), the articles of the present invention exhibit better mechanical characteristics, as well as high resistance to thermal stresses and sound insulation and sound-absorbing properties.

A further special feature of the articles of the present invention is that it can easily be thermoformed so that in the same article parts with different mechanical properties coexist (for example a substantially rigid central part and a more flexible side part).

These articles are obtained by shaping the inner surface of the two half-moulds so as to have cavities with different volumes that determine in the end thermoformed article parts with greater thickness (less compact) and parts with lower thickness (more compact). During moulding, indeed, such cavities generate different degrees of compression of the multilayer pack, variable from one area to another. The different degree of compression gives such areas of the material different properties, like for example flexural modulus of elasticity, resilience, sound-insulating/absorbing and heat-insulating/absorbing.

The combined use of the hot-moulding technique to form the multilayer material of the present invention thus makes it possible to modulate the mechanical properties of an article in a targeted manner over its entire volume as a function of the application requirements of the thermoformed product.

The articles of the present invention are also characterised in that they have a "surface density", i.e. the weight/unit surface ratio ($g/m^2$), that remains constant in every point of the article. The weight of the article, indeed, is determined exclusively by the specific sequence of layers that constitutes the multilayer pack.

The possibility of obtaining articles in a single body in which areas of greater density and areas of lower density of multilayer material coexist, makes the material of the present invention a particularly advantageous alternative to the polymeric materials used in the field, in particular in the field of automotive components.

With polymeric materials, indeed, it is possible to obtain exclusively components for automobiles having a homogeneous composition in their entire volume, since the techniques for processing such materials, like for example injection moulding, do not allow the density of the material to be varied in different points of the body of a single moulded article.

The mechanical properties of an article made of polymeric material depend, therefore, mainly on the thickness of the material at each point. This characteristic means that the parts of the article having lower thickness are substantially weaker from the mechanical point of view and, therefore, are more likely to become damaged during their manipulation (e.g. installation inside the passenger compartment of an automobile).

With the multilayer composite material of the present invention it is also possible to make articles having extremely different mechanical characteristics (for example resilience and modulus of elasticity) for the same composition (and, therefore, overall weight) of the material used. Thanks to such versatility, for example, with the same multilayer material—i.e. with the same sequence of juxtaposed layers of material—it is possible to make articles for extremely different uses, by acting in a simple manner on the hot thermoforming conditions (for example, a coating panel for the inside of the doors of an automobile or a dashboard or a bumper).

As can easily be seen by the man skilled in the art from the present description, the use of the multilayer composite material of the present invention is not limited to just making components for automobiles, but it can also be used to make articles intended for any kind of application where high mechanical performance and low weight are required. Other possible fields of application of the present invention are, for example, the production of components for trains, aeroplanes, boats and furnishing.

EXAMPLES

The mechanical properties of the articles made of multilayer material according to the present invention have been evaluated by determining the values of flexural modulus of elasticity (E) and of resilience (R) of some thermoformed samples having different composition.

The following materials were prepared.

Material 1: a series of articles according to the present invention was prepared by hot-pressing multilayer packs characterised by a sequence of layers (B) (A) (B) (A) (B), where the reinforcement layers (B) are layers of glass fibres (mat—100 $g/m^2$) and the structural layers (A) are mats of needle punched polyester fibres impregnated on both faces with a polyurethane resin.

In order to obtain a curve representative of the properties of the material as its weight varies, a series of samples of Material 1 was prepared by varying the amounts of resin applied overall on the needle punched mats (from 80 $g/m^2$ to 300 $g/m^2$).

Each multilayer pack was pressed in a mould at a temperature of 130° C. until a sheet is obtained having a thickness of 2.5 mm. The sheet was then cut into a series of samples to carry out the characterisation test.

Material 2: a second series of articles according to the present invention was made starting from a multilayer pack (B) (A) (B) (A) (B) identical to that of Material 1 with the exception of the reinforcement layers (B) consisting of layers of kevlar fibres (mat—100 $g/m^2$).

The thermoforming was carried out under the same conditions as the thermoforming of Material 1.

Material 3: a third series of articles according to the present invention was made starting from a multilayer pack (B) (A) (B) (A) (B) identical to that of Material 1 with the exception of the reinforcement layers (B) consisting of layers of carbon fibres (mat—100 $g/m^2$).

The thermoforming was carried out under the same conditions as the thermoforming of Material 1.

For comparison, the following materials of the state of the art were also prepared:

Material 4, polypropylene reinforced with glass fibres (weight ratio polypropylene/glass fibres: 70/30);

Material 5, polypropylene reinforced with sawdust (WOODSTOCK®, weight ratio polypropylene/wood: 50/50);

Material 6, mixture of polycarbonate/ABS (BAYBLEND T85®, weight ratio polycarbonate (PC)/ABS: 85/15);

Material 7, expanded polyurethane reinforced with glass fibres (r-rim) (weight ratio polyurethane/glass fibres: 70/30).

Materials 4-7 were formed through injection moulding.

Materials 1-7 were subjected to testing to determine the flexural modulus of elasticity (Young's modulus) according to standard ISO 178), using a sample of material of dimensions 25 mm in width, 50 mm in length and 2.5 mm in thickness.

Materials 1-7 were subjected to testing to determine resilience (Charpy) according to standard ISO 179.

Figure 5:
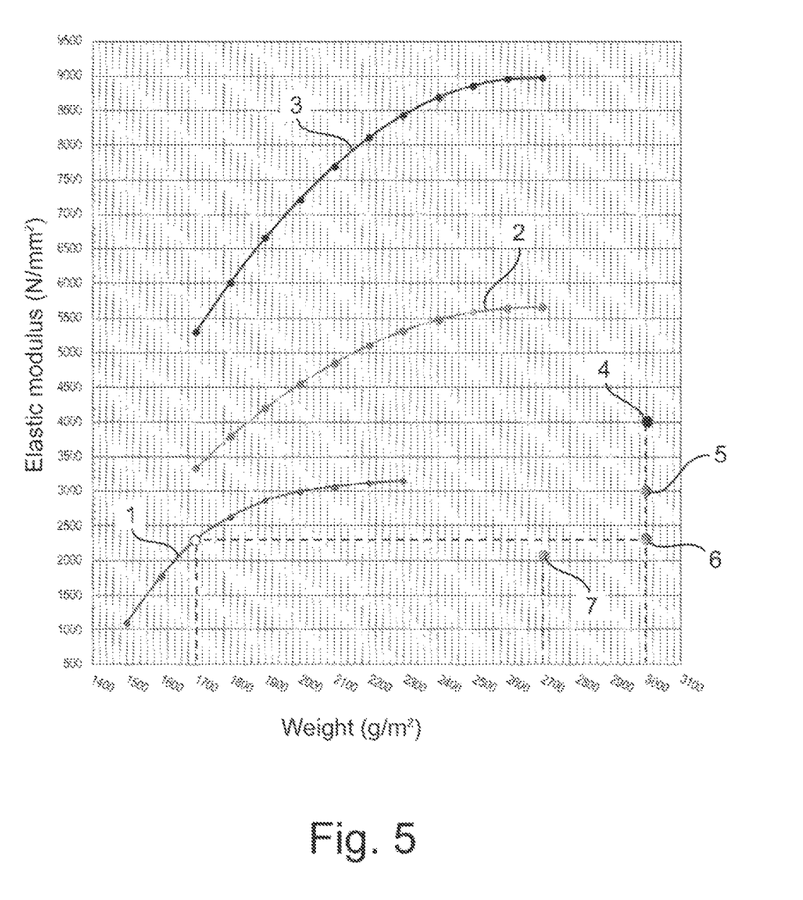
FIG. 5, "flexural modulus of elasticity (E)/material weight" curves for some embodiments of the multilayer composite material of the invention.
Figure 6:
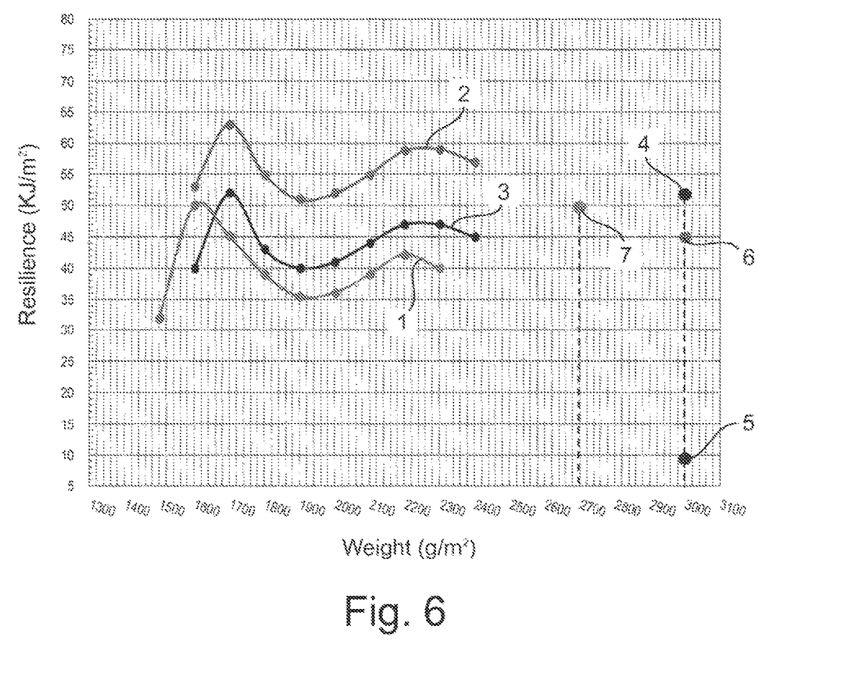
FIG. 6, "resilience (R)/material weight" curves for some embodiments of the multilayer composite material of the invention.

The values of the flexural modulus of elasticity (E) and resilience (R) obtained for the different materials are given in FIGS. 5 and 6.

From the figures it is clear that with the multilayer materials of the present invention (Materials 1-3) it is possible to obtain the same performance, in terms of modulus of elasticity and/or resilience, as the thermoplastic materials of the state of the art (Materials 4-7), but with a much lower weight. Alternatively, it is possible to obtain articles with better mechanical performance for the same weight.

Table 1 shows some data extrapolated from FIGS. 5 and 6, which highlight the differences in weight between the multilayer material of the present invention and the thermoplastic materials of the state of the art, in materials having roughly the same mechanical characteristics.

TABLE 1

| Material (n.) | Modulus of elasticity (N/mm²) | Resilience (KJ/m²) | Weight (g/m²) |
| --- | --- | --- | --- |
| 1 (glass fibres) | 2600 | 39 | 1800 |
| 2 (kevlar fibres) | 3800 | 55 | 1800 |
| 3 (carbon fibres) | 6000 | 43 | 1800 |
| 4 (PP + 30% glass fibres) | 4000 | 52 | 3000 |
| 5 (Woodstock ®) | 3000 | 7 | 3000 |
| 6 (PC + ABS) | 2300 | 45 | 3000 |
| 7 (R-Rim) | 2100 | 57 | 2700 |

The modulus of elasticity of Materials 1, 2 and 3 was also measured at a temperature of 100° C.

At this temperature Materials 4-7 have a marked degradation in stiffness that impedes detection of the modulus of elasticity, whereas for Materials 1-3 no variations were observed with respect to the value determined at 23° C.

The experimental data also shows that when keeping the other conditions the same, the use of reinforcement layers (B) made with kevlar or carbon fibres makes it possible to obtain thermoformed articles with considerably higher modulus of elasticity values with respect to the corresponding articles with reinforcement layers (B) made of glass fibres.

The experimental data demonstrates that with the material of the present invention and the preparation method thereof it is possible to modulate the mechanical properties of a thermoformed article in a wide range of values, by suitably selecting the sequence of materials of the multilayer pack and the forming conditions.

The invention claimed is:

1. An article made of multilayer composite material, the multilayer composite material comprising central element (I) between first and second reinforcement layers (B) to form structure (B)-(I)-(B), the central element (I) consisting of:
    first structural layer (A), consisting of at least one first mat of first needle punched thermoplastic fibres selected from the group consisting of polyester fibres, polyamide fibres, polypropylene fibres, or mixtures thereof, the at least one first mat having a first face and a second face;
    second structural layer (A), consisting of at least one second mat of second needle punched thermoplastic fibres selected from the group consisting of polyester fibres, polyamide fibres, polypropylene fibres, or mixtures thereof, the at least one second mat having a third face and a fourth face; and
    third reinforcement layer (B) between the first structural layer (A) and the second structural layer (A);
    wherein the first, second, and third reinforcement layers (B) each consist of fibrous material, comprising one or more types of fibres selected from the group consisting of glass fibres, natural fibres, carbon fibres, basalt fibres, aramid fibres, or mixtures thereof,
    wherein the first structural layer (A) is bound to the first and third reinforcement layers (B) using only thermosetting resin on one or both of the first or second faces, and
    wherein the second structural layer (A) is bound to the second and third reinforcement layers (B) using only the thermosetting resin on one or both of the third or fourth faces.

2. The article of claim 1, comprising:
    at least one outer coating layer (D) applied to the first or second reinforcement layer (B) of the structure (B)-(I)-(B);
    wherein the at least one outer coating layer (D) comprises fabric, natural leather, synthetic leather, or non-woven fabric.

3. The article of claim 1, wherein the first, second, and third reinforcement layers (B) each consist of fibrous material, comprising glass fibres and/or natural fibres mixed with one or more types of fibres selected from the group consisting of carbon fibres, basalt fibres, or aramid fibres.

4. The article of claim 1, wherein the thermoplastic fibres are polyester fibres.

5. The article of claim 1, wherein at least two portions of the multilayer composite material, having different thicknesses, coexist.

6. The article of claim 1, wherein the first reinforcement layer (B) consists of fibrous material, comprising glass fibres and/or natural fibres mixed with one or more types of fibres selected from the group consisting of carbon fibres, basalt fibres, or aramid fibres.

7. The article of claim 1, wherein the first reinforcement layer (B) consists of fibrous material, comprising glass fibres mixed with one or more types of fibres selected from the group consisting of carbon fibres or basalt fibres.

8. The article of claim 1, wherein the first reinforcement layer (B) consists of fibrous material, comprising natural fibres mixed with one or more types of fibres selected from the group consisting of carbon fibres, basalt fibres, or aramid fibres.

9. The article of claim 1, wherein the first reinforcement layer (B) consists of fibrous material, comprising natural fibres mixed with one or more types of fibres selected from the group consisting of carbon fibres or basalt fibres.

10. The article of claim 1, wherein the third reinforcement layer (B) consists of fibrous material, comprising glass fibres and/or natural fibres mixed with one or more types of fibres selected from the group consisting of carbon fibres, basalt fibres, or aramid fibres.

11. The article of claim 1, wherein the third reinforcement layer (B) consists of fibrous material, comprising glass fibres mixed with one or more types of fibres selected from the group consisting of carbon fibres or basalt fibres.

12. The article of claim 1, wherein the third reinforcement layer (B) consists of fibrous material, comprising natural fibres mixed with one or more types of fibres selected from the group consisting of carbon fibres, basalt fibres, or aramid fibres.

13. The article of claim 1, wherein the third reinforcement layer (B) consists of fibrous material, comprising natural fibres mixed with one or more types of fibres selected from the group consisting of carbon fibres or basalt fibres.

14. A component for automobiles, comprising the article made of the multilayer composite material of claim 1.

15. A process for preparing the article made of the multilayer composite material of claim 1, comprising:
    coating the first and second structural layers (A) with the thermosetting resin;
    juxtaposing the first and second structural layers (A) and the reinforcement layers (B) on top of one another, forming a multilayer pack; and hot-pressing the multilayer pack in a mold and obtaining the article made of the multilayer composite material.

16. The process of claim 15, wherein the hot-pressing is carried out at a temperature or temperatures greater than or equal to 90° C. and less than or equal to 180° C.

17. The process of claim 15, wherein the juxtaposing further comprises interposition, between the layers of the multilayer pack, of one or more additional layers of material according to a desired juxtaposition sequence, the one or more additional layers comprising:
one or more coating layers (D) of fabric, natural leather, synthetic leather, or non-woven fabric.

18. The process of claim 15, wherein the hot-pressing is carried out at a temperature or temperatures greater than or equal to 110° C. and less than or equal to 150° C.

* * * * *